June 28, 1932.  A. G. BOWEN  1,865,300
UNIVERSAL JOINT
Filed Oct. 29, 1928
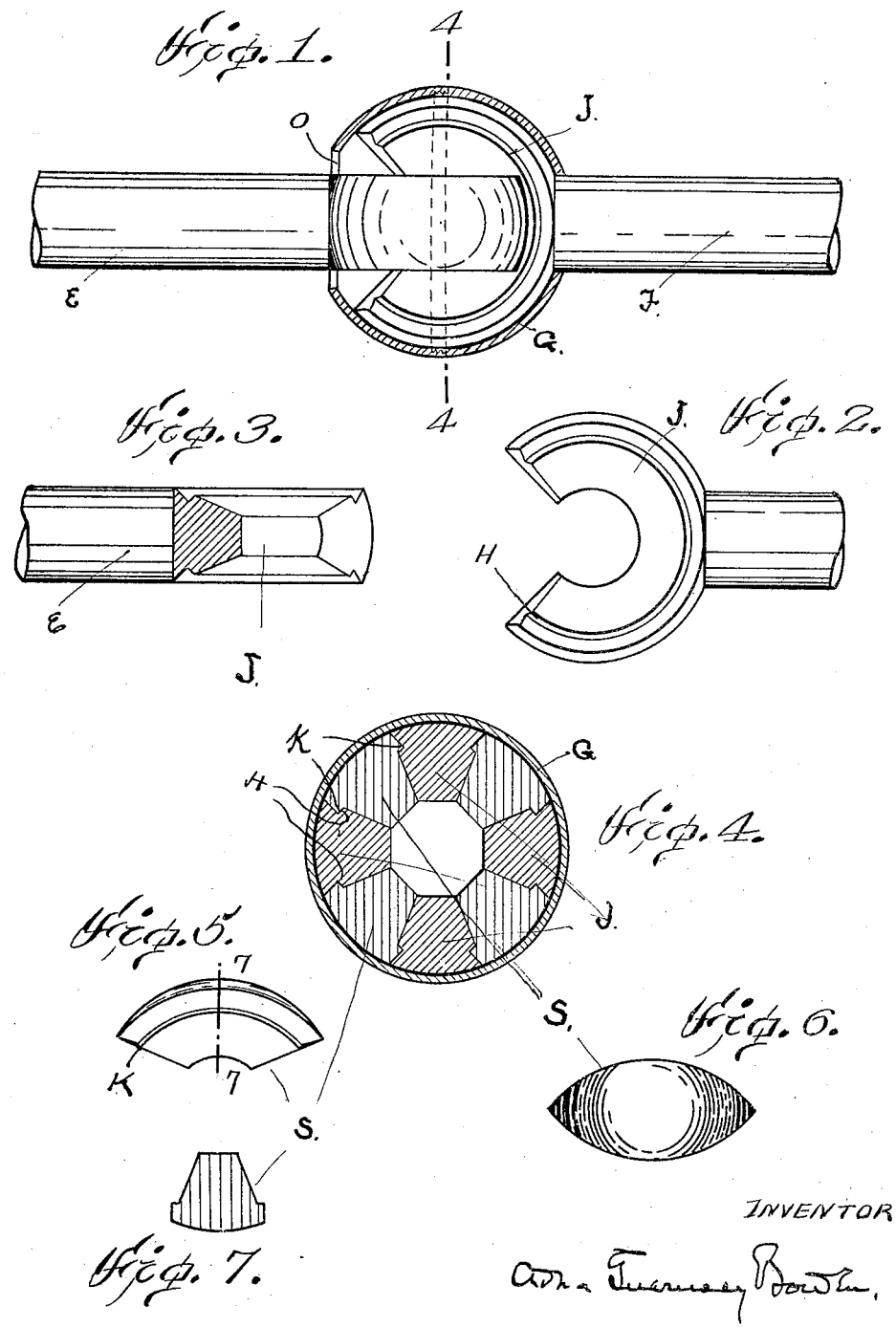
INVENTOR:
Asa Tierney Bowen Patented June 28, 1932

1,865,300

UNITED STATES PATENT OFFICE

ADNA GUERNSEY BOWEN, OF MEDINA, NEW YORK

UNIVERSAL JOINT

Application filed October 29, 1928. Serial No. 315,797.

My invention has for its object the production of a better universal joint.

Such object I accomplish by the construction and arrangement illustrated in the accompanying drawing, in which—

Figure 1 is a view, in side elevation, of the forked driving and driven connections of my preferred form of universal joint, the housing shell being in section to expose the enclosed parts, and the spherical segmental members being omitted in order to show the cheeks of the forked elements;

Fig. 2 is a detail view in elevation of one of the forked elements;

Fig. 3 is a similar view of one of the forked elements, rotated about its axis at an angle of 90 degrees, one of the arms of the fork being shown in cross-section;

Fig. 4 is a transverse sectional view on the line 4—4 of Fig. 1, showing the spherical segmental members associated with the forked elements;

Fig. 5 is a detail view, in side elevation, of one of the spherical segmental members;

Fig. 6 is a detail view of the spherical external surface of one of said segmental members; and Fig. 7 is a transverse sectional view of one of said segmental members taken on the line 7—7 of Fig. 5.

Like reference letters in the several figures denote the same parts.

A universal joint constituting a preferred form of my invention is illustrated in the accompanying drawing in connection with two shaft members E and F, and embodies, in its construction, the two fork-like members or jaws J, each having cheeks provided with shoulders H; said fork-like members being arranged at right angles to each other, as shown in cross-section in Fig. 4, and receiving, between their cheeks or bearing surfaces, the free spherical segmental members S, (shown specifically in Figs. 5, 6 and 7), of which there are four, as shown in Fig. 4. These spherical segmental members are held in operative assembly with the shoulders H of the fork-like members and are prevented from displacement, radially outwardly, by the hollow casing or shell G. It will be noted that the segmental members are provided with flanges K, which rest upon the shoulders H. The relationship existing between the arms of the assembled forks and the segmental members is shown in Fig. 4, and it will be noted that the fork arms have, for the lack of a better term, the cross-sectional shape of a notched keystone, in the notches of which, providing the shoulders H, are seated the flanges K of the segmental members. Thus, the segmental members S are prevented, by their flanges K and the shoulders H, from slipping radially inwardly and becoming wedged or jammed between the cheeks of the fork arms. While the casing or shell G will prevent the segmental members from slipping radially outwardly from their positions between the forks, it is a special feature of the preferred form of my invention disclosed, that the edges of the flanges K of the segmental members, are not radially disposed as are the bearing surfaces proper of the segmental members, but are substantially square with the plane defined by the chords of the spherical outer surface of the respective wedge. By reason of this square relationship between the edges and the complementary form of the notches in the forks, the segmental members may be readily assembled with the forks, yet, when the joint is transmitting torque, there is a marked tendency of the pressure transmitted through the flanges K, to force the wedges radially inwardly, in opposition to, and to a considerable extent neutralizing, the tendency of the wedges of the segmental members to be squeezed radially outwardly by reason of the wedging relationship existing between their bearing surfaces proper and the cheek surfaces proper of the forks.

The shell G, in my device, can be made to wholly enclose the forks and segmental members, leaving only a sufficient opening O, for the necessary universal movement, and by means of a sealed covering or jacket, well-known in the art, can be made substantially oil-tight. The shell G is preferably made in two sections, threaded together, but, as is obvious, may be formed in two sections held together by bolts, or, may even consist of a sheet metal stamping, permanently swaged or spun around the assembled parts of the joint. As an equivalent expedient, the shell G might be made in the form of a simple ring disposed around the center of the joint, and pinned to the forks or to the segmental members in such manner as to permit free working of the enclosed parts, relative to each other.

While in my preferred embodiment, I have shown fork arms having the cross-sectional form of a notched keystone, providing shoulders H at the base of the notches or peripheral grooves of the fork arms, which shoulders provide guideways and stops for flanges K of the segmental members, it is not an essential of this invention that the flanges K be thus accommodated and occupy this particular position, since, obviously, they may be near the center of the joint or there may be a number of shoulders and flanges, or the flange K may be quite thin and rest upon the spherical or outermost surfaces proper of the forks J, which surfaces will then become the equivalent of the shoulders H. In this last case, however, the spherical members are squeezed or pressed against the shell G, when the joint is in operation, whereas when the joint is made with shoulders and flanges, illustrated as the preferred form, the tendency to squeeze the segmental members radially outwardly neutralized, or materially minimized. The center of the joint is preferably hollow, as illustrated, and may be utilized as a grease reservoir.

It will thus be seen that, in its broadest aspect, my invention comprises forked members having cheeks or bearing surfaces on the sides thereof, which, when assembled, define spaces for the snug reception of spherical segmental members, which spherical segmental members are provided with flanges which overlie portions of the fork arms and prevent the segmental members from moving radially inwardly and becoming wedged or jammed between the opposite cheeks of the fork arms, and a retaining device for holding the segmental members and the forks with which they are associated in assembly.

I am aware that numerous changes may be made in the form of the parts constituting a preferred embodiment of my invention, and, therefore, claim my invention broadly, as indicated by the appended claims.

What I claim is:—

1. A universal joint comprising driven and driving connections terminating in curved forks disposed for universal movement about a common geometrical center, each having cheeks opposing those of the other, defining therebetween spaces of spherical segmental form, means associated with said forks, constituting guides for determining relative movements thereof, and transmitting torque therethrough, comprising segmental members snugly but freely disposed in the spaces defined by the opposing cheeks of the associated forks, said segmental members having laterally extending peripheral flanges seated upon said forks radially outward of said cheeks and positively preventing said segmental members from becoming wedged or jammed radially inwardly between the cheeks of said forks, and means for maintaining said forks and segmental members in assembly.

2. A universal joint comprising driven and driving connections terminating in curved forks disposed for universal movement about a common geometrical center, the cheeks of said forks being each provided with a peripheral groove, means associated with said forks, constituting guides for determining relative movements thereof, and transmitting torque therethrough, comprising flanged segmental members snugly but freely disposed in the spaces defined by the opposing cheeks of the associated forks, the flanges of said segmental members being disposed in the peripheral grooves of the fork cheeks and positively preventing said segmental members from becoming wedged or jammed radially inwardly between the cheeks of the forks and means for maintaining said forks and segmental members in assembly.

3. A universal joint comprising driven and driving connections terminating in curved forks disposed for universal movement about a common geometrical center, the arms of said forks having cheeks each of which is provided with an intermediate shoulder, means associated with said forks, constituting guides for determining relative movements thereof, and transmitting torque therethrough, comprising segmental members snugly but freely disposed in the spaces between opposing cheeks of said fork arms, said segmental members having intermediate shoulders engaged upon the shoulders of said fork arms, which shoulders positively prevent said segmental members from becoming wedged or jammed radially inwardly between the cheeks of said fork arms and means for maintaining said forks and segmental members in assembly.

4. A universal joint comprising driven and driving connections terminating in curved forks disposed for universal movement about a common geometrical center, the arms of said forks having, in cross section, the form of a notched keystone, that is, having radially interrupted cheek surfaces providing on each cheek an intermediate shoulder, means associated with said forks, constituting guides for determining relative movements thereof, and transmitting torque therethrough, comprising segmental members snugly but freely disposed in the spaces between opposing cheeks of said fork arms, said segmental members having intermediate shoulders engaged upon the shoulders of said fork arms, which shoulders positively prevent said segmental members from becoming wedged or jammed radially inwardly between the cheeks of said fork arms and means for maintaining said forks and segmental members in assembly.

5. A universal joint comprising driven and driving connections terminating in curved forks disposed for universal movement about a common geometrical center, the arms of said forks having, in cross section, the form of a notched keystone, that is, having radially interrupted cheek surfaces providing on each cheek an intermediate shoulder, means associated with said forks, constituting guides for determining relative movements thereof, and transmitting torque therethrough, comprising segmental members snugly but freely disposed in the spaces between opposing cheeks of said fork arms, said segmental members each having inner radially converging bearing surfaces which engage those cheek portions of the fork arms which are radially inward of said shoulders, outer bearing surfaces which are not convergent radially inwardly, which outer bearing surfaces engage those cheek portions of the fork arms which are radially outward of said shoulders, and shoulders intermediate the radially convergent and non-convergent bearing surfaces, which last mentioned shoulders engage and ride upon the shoulders of the fork arms positively preventing said segmental members from becoming wedged or jammed radially inwardly between the cheeks of said fork arms and means for maintaining said forks and segmental members in assembly.

ADNA GUERNSEY BOWEN.